(12) United States Patent
Schneider

(10) Patent No.: US 8,639,633 B2
(45) Date of Patent: Jan. 28, 2014

(54) ATTRIBUTE SCORING SYSTEM AND METHODS

(75) Inventor: Theodor Schneider, Delaware, OH (US)

(73) Assignee: Oracle Taleo LLC, Redwood Shores, CA (US)

(*) Notice: Subject to any disclaimer, the term of this patent is extended or adjusted under 35 U.S.C. 154(b) by 199 days.

(21) Appl. No.: 13/117,728

(22) Filed: May 27, 2011

(65) Prior Publication Data

US 2013/0031015 A1  Jan. 31, 2013

Related U.S. Application Data

(60) Provisional application No. 61/349,457, filed on May 28, 2010.

(51) Int. Cl.
  *G06Q 10/00* (2012.01)
(52) U.S. Cl.
  USPC ............................................. 705/321
(58) Field of Classification Search
  USPC ............................................. 705/321
  See application file for complete search history.

(56) References Cited

U.S. PATENT DOCUMENTS

| | | | |
|---|---|---|---|
| 7,792,685 B2* | 9/2010 | Andino et al. | 705/1.1 |
| 7,827,125 B1* | 11/2010 | Rennison | 706/14 |
| 8,046,251 B2* | 10/2011 | Scarborough et al. | 705/7.17 |
| 2001/0034630 A1 | 10/2001 | Mayer et al. | |
| 2002/0055870 A1 | 5/2002 | Thomas | |
| 2002/0165763 A1 | 11/2002 | Friedlander et al. | |
| 2002/0198766 A1* | 12/2002 | Magrino et al. | 705/11 |
| 2011/0055098 A1* | 3/2011 | Stewart | 705/321 |

* cited by examiner

*Primary Examiner* — Jami A Plucinski
*Assistant Examiner* — Olukayode Alabi
(74) *Attorney, Agent, or Firm* — Kilpatrick Townsend & Stockton LLP

(57) ABSTRACT

Systems and methods for collecting data from one or more scoring candidates, storing such data in a database, and transforming such data using various techniques and software modules to generate a personal tracking and development score that determines an individual's proficiency for skills that are mapped to a job profile are depicted. Users may be ranked or compared against each other with similar units of measure. An attribute score may be used as a benefit for career development similar to the benefit a credit score may provide in assessing a user's financial records.

19 Claims, 15 Drawing Sheets

Default SkillScore Rating for Job Profile A

| Min | Max |
|-----|-----|
| 0 | 1000 |

Job Profile A

| | Weight | | Score | | Status | | SkillScore Value |
|---|---|---|---|---|---|---|---|
| SkillA | 200 | × | 80% | & | Complete | = | 160 |
| SkillB | 200 | × | 50% | & | Incomplete | = | 0 |
| SkillC | 200 | × | 75% | & | Complete | = | 150 |
| SkillD | 200 | × | 100% | & | Complete | = | 200 |
| SkillE | 200 | × | 0% | & | Exempt | = | 200 |

Job Profile A SkillScore: 710

FIGURE 3

Job Profile To Users

Map Users to this Job Profile · Remove Checked Mappings 6 results returned. Page 1 of :

| | Username | Name [Last, First] | Status | User Self Mapped? | Skill Score® | Actions |
|---|---|---|---|---|---|---|
| 1 | AJOINER | Joiner, Allison | Incomplete | ✓ | 250 | |
| 2 | DRIZZARDO | Rizzardo, Dave | Incomplete | ✗ | 50 | |
| 3 | FSMITH | Smith, Frieda | Completed | ✗ | 50 | |
| 4 | MELIAS | Elias, Maggie | Incomplete | ✗ | 0 | |
| 5 | SLEWIS | Lewis, Simon | Completed | ✗ | 1000 | |
| 6 | SMCDOUGAL | McDougal, Shiela | Incomplete | ✗ | 250 | |

Job Profile To Skills (A)

| | Skill | Skill Weightage (%) | Actions |
|---|---|---|---|
| 1 | 16072 Skill | Equally Distributed | ☐ |
| 2 | 18313 Skill | Equally Distributed | ☐ |
| 3 | Skill 123 | Equally Distributed | ☐ |
| 4 | Skill 20951 | Equally Distributed | ☐ |

✎ Modify Skills Weightage  ✣ Map Skills to this Job Profile  ✦ Remove Checked Mappings 4 results returned. Page 1 of 1

(A)

Job Profile To Skills (B)

| | Skill | Skill Weightage (%) | Actions |
|---|---|---|---|
| 1 | 16072 Skill | 40 | ☐ |
| 2 | 18313 Skill | 20 | ☐ |
| 3 | Skill 123 | 40 | ☐ |
| 4 | Skill 20951 | 0 | ☐ |

✎ Modify Skills Weightage  ✣ Map Skills to this Job Profile  ✦ Remove Checked Mappings 4 results returned. Page 1 of 1

ATTRIBUTE SCORING SYSTEM AND METHODS

CROSS-REFERENCE TO RELATED APPLICATIONS

This application claims the benefit of U.S. Provisional Patent Application No. 61/349,457 filed May 28, 2010, the entire disclosure of which is incorporated herein by reference.

FIELD OF INVENTION

The present invention relates to an attribute scoring system, more specifically to a personal tracking and development score that determines an individual's proficiency for skills that are mapped to a job profile.

BACKGROUND

Research shows individuals who invest in their own development generate significantly more revenue for their organization than ones who do not. However, distinguishing and ranking individuals based purely on resumes is very challenging. Accordingly, a need exists for a database and related interface system to normalize and score various attributes. With such a system, "job ready" applicants can be scored and indexed for review by employers and other users. Such a system provides organizations with a way to assess critical skill levels and other attributes with a quantitative assessment, score or rank and not just a resume.

SUMMARY OF THE INVENTION

Embodiments of the present invention include systems and methods for collecting data from one or more scoring candidates, storing such data in a database, and transforming such data using various techniques and software modules to generate a personal tracking and development score that determines an individual's proficiency for skills that are mapped to a job profile. Users may be ranked or compared against each other with similar units of measure. Illustrative embodiments provide an attribute score as a benefit for career development similar to the benefit a credit score may provide in assessing a user's financial records. According to one embodiment, a job profile can have a maximum Skill Score of 1,000 points.

Attribute scores can help employers navigate the sea of sameness with the floods of resumes they receive, and can also help hiring managers know right away whether candidates have the attitude and aptitude needed for a position and whether they match the skill levels of other top employees.

According to one embodiment, an attribute score can be added and calculated for each job profile based upon the completion and passing of exams for a course or seminar mapped to a certain job profile. Each time a user finishes all of the courses in a skill she can see her attribute score go up. According to one embodiment, an algorithm is used to calculate the value of the attribute automatically based upon how many attributes are mapped to a job profile.

Embodiments of the invention are advantageous in that the system allows members to understand the skills required for some of the fastest growing jobs categories as well as allows members to easily track their skill level and how they compare against others in the same field. Another advantage to certain embodiments includes allowing potential employers to easily understand a candidate's job readiness and relevancy of skills for the job. The system also creates structured and standardized development for job profiles with a standardized rating system and allows members to improve specific skills that relate directly to those job profiles. Embodiments of the systems enable users to receive an attribute score and printable certification for a job profile that can be shown to potential employers Another embodiment of the invention allows users to compare their current skills to other job profiles in the system and determine how compatible they are to the new job profile as well as allowing potential employers an easy way to search for candidates.

According to one embodiment of the invention, a computer system for characterizing job applicant data includes a memory device and a processor in communication with the memory device. The memory device comprises instructions that when executed by the processor causes the processor to define a range for an attribute score, define a profile comprising a maximum number of attributes, and calculate the attribute score for a user based on a number of satisfied attributes out of the maximum number of attributes. The attribute score is compared to a threshold score to determine a level of correlation between the user and the profile.

Another embodiment of the invention includes a system for quantifying a user's correlation to a suggested profile. The system includes a user-interface in communication with a network. The user-interface presents the user with a plurality of available attributes. The plurality of available attributes define the suggested profile. The system further includes a server in communication with the network and a processor in communication with the server. The processor is configured to calculate an attribute score based on a number of user-selected attributes out of the plurality of available attributes. The processor further compares the attribute score to a threshold score to determine a correlation between the user and the profile.

According to another embodiment, a non-transitory computer-readable medium includes computer-executable instructions for performing a method of quantifying a user's correlation to a suggested profile. The method includes defining a range for an attribute score and defining a profile comprising a maximum number of attributes. The attribute score is calculated for a user based on a number of satisfied attributes out of the maximum number of attributes. The attribute score is then compared to a threshold score to determine a level of correlation between the user and the profile.

According to another embodiment, a computer-based method of normalizing a pool of individuals relative to at least one *Score includes displaying a first icon in a first computer interface, wherein the first computer interface comprises data input fields relating to skills, goals, and development plan items. A scoring engine is launched to convert the data received from the data input fields into skill scores, goal scores, and a development plan. The skill scores, goal scores, and development plan are processed using the scoring engine to generate a plurality of job profile scores. The plurality of job profile scores are then transformed into a talent score.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 3 is a diagram of a sample calculation of a complex Skill Score in accordance with an illustrative embodiment of the invention;

FIG. 7 is a screen/graphic interface for a Job Profile—User Mappings object in accordance with an illustrative embodiment of the invention;

FIG. 9 is a screen/graphic interface for a Job Profiles Compare object in accordance with an illustrative embodiment of the invention;

FIG. 13A-B are screen/graphic interfaces for a Job Profile to Skills object in accordance with an illustrative embodiment of the invention;

FIG. 14A-B are screen/graphic interfaces is a screen/graphic interface for a Job Profile to Skills object in accordance with an illustrative embodiment of the invention; and FIG. 15A-B are screen/graphic interfaces is a screen/graphic interface for a Skills to Job Profile object in accordance with an illustrative embodiment of the invention.

DETAILED DESCRIPTION

Figure 1:
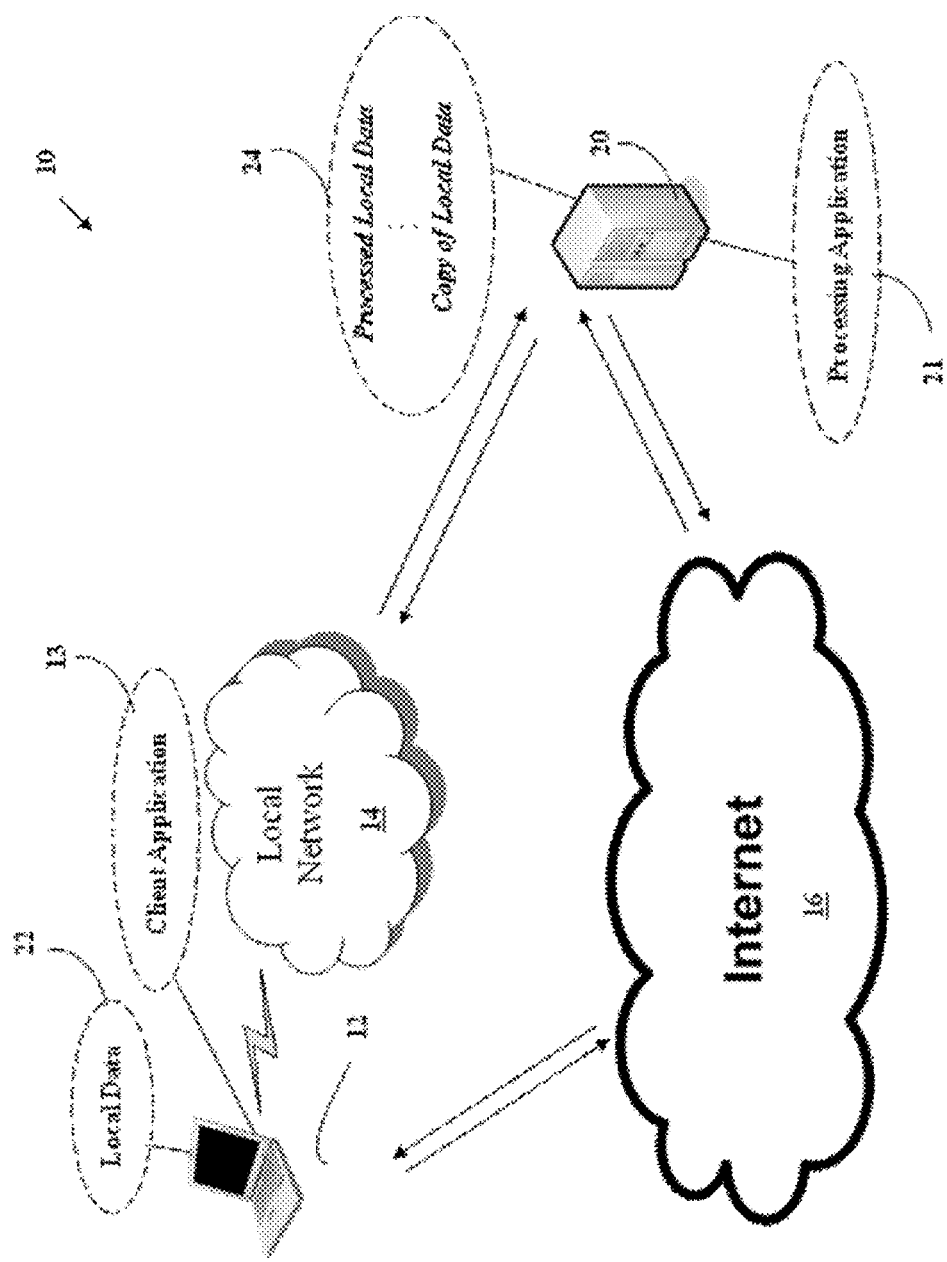
FIG. 1 is a schematic diagram of a network-based system for collecting and transforming data from a pool of scoring candidates and generating one or more *Scores in accordance with an illustrative embodiment of the invention.

The invention can be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

Embodiments of the present invention include systems and architecture implemented in a server/client framework over a network. As shown in FIG. 1 below, a client application 13 resides on a local computer 12 having local data stored thereon. The client application can communicate with the server 20 hosting the processing application via a local network 14, such as a LAN or via a wide area network such as the internet 16. The server 20 hosts the processing application as well as storage for processed local data and copies of local data. Storage of data on either the server of the client application may be localized in the form of a hard disk, optical media flash memory, etc., or may be remotely stored and accessed via a network.

According to one embodiment, a processing application, referred to herein as the Learn Center, collects and stores talent data about users based on completion and progress of tasks, goals and skill requirements in the Learn Center. Embodiments of the system can create a recognizable attribute score, referred to herein as a *Score based on the individual user's completion or association with the given tasks and qualifications. As used herein *Score may represent any qualitative attribute score such as, without limitation, Item Score, Job Score, Talent Score, Job Profile Score, Goal Score, Skill Score. These types of scores provide a basis to input, categorize, and quantify various types of data about a person. This person-specific data may include school attended, years of work experience, licensing and certificate information, employer and colleague recommendations, educational prestige factors, training courses, standardized tests, GPA, and other inputs to inform and shape a score, rank or other identifier that quantitatively evaluates the user on a scale relative to other candidates. Users can then be ranked or compared against each other with similar units of measure.

Embodiments of the invention may be implemented through multiple interfaces and in multiple environments to provide a broad enterprise system for many uses. Job seekers may use one embodiment to build a profile showcasing his qualifications for a specific job. Employment firms may use an embodiment to allow job-seekers to build profiles and submit applications for jobs posted through the agency of web-site. Companies may use an embodiment as a management tool to evaluate candidates for employment, or deciding which employees are best suited for certain departments, tasks or projects.

Further, as explained below, embodiments of the system may be implemented through a la carte components with certain features allowing users, evaluators and managers to purchase certain functionalities while opting out of others that do not meet their needs. In one embodiment, educational or training systems are one aspect of the invention and may include, but are not limited to a demonstration function and training or support relating to collecting data for score generation and using the scores and reports described herein.

Dynamic objects or Dynamic Content Tags ("DCT") can have the ability to make the *Score fields available for users to view on web pages. The following DCTs can, according to one embodiment, have the *Score available as a selectable field in a graphical user interface ("GUI") wizard (described below): Job Profile, Skill Score, Goal Score, My Profile, Skill Score, Goal Score. Further, users can view their Skill Score on any page of a user interface screen or other display using the Job Profiles Dynamic Content Tag. Components of the Learn Center can be integrated into the flexible design and flexibility of the various systems and platforms such as automated human resource data mining and evaluation systems. In one embodiment, the following reports can have the *Score fields available for report users to view: The Learn Center Report, Skill Score, GoalScore, Best Match Report. The graphic user interface or (GUI) may include a dashboard interface in which each *Score can be represented with a horizontal graphical representation similar to 'graph' in my profile or course progress. In one embodiment, each *Score can have a three point threshold setting in the root Learn Center which determines a percentage setting for each color. For example, *Scores ranging from 0-60 are colored a first color, 60-80 are colored a second color, 80-100 are colored a third color. Further details and implementations of the user interface are described below.

In general embodiments of the system may be developed, enhanced and upgraded subject to the following requirements: all data reported, viewed, or stored can remain in the same state prior to and after enhancements (e.g., a user can have the same state of view of their DCT before and after any system upgrades); every feature selection, setting, or business rule can have a documented and predefined default; reduced and minimized screen refreshes and upload times (typical loading times for web pages should be between 1-20 seconds depending on performance of network, data rendering, peak/non-peak times, etc., if longer than 30 seconds a warning can be noted to user); any DCTs or user's actions views that are affected can be updated.

According to one embodiment of the invention, the Learn Center system may include a verity of *Scores, for example:

Skill Score: This score determines user's proficiency for skills that are mapped to a job.

Goal Score: This score determines user's proficiency for goals that are mapped to a job.

Development Plan Score: This score determines user's proficiency for development plans that are mapped to a job.

Job Profile Score: This score determines user's proficiency for a job profile. It is a sum of Skill Score, Goal Score and Development Plan Score for the job profile.

Talent Score: This score determines user's proficiency based on all the job profiles mapped to the user.

Figure 2:
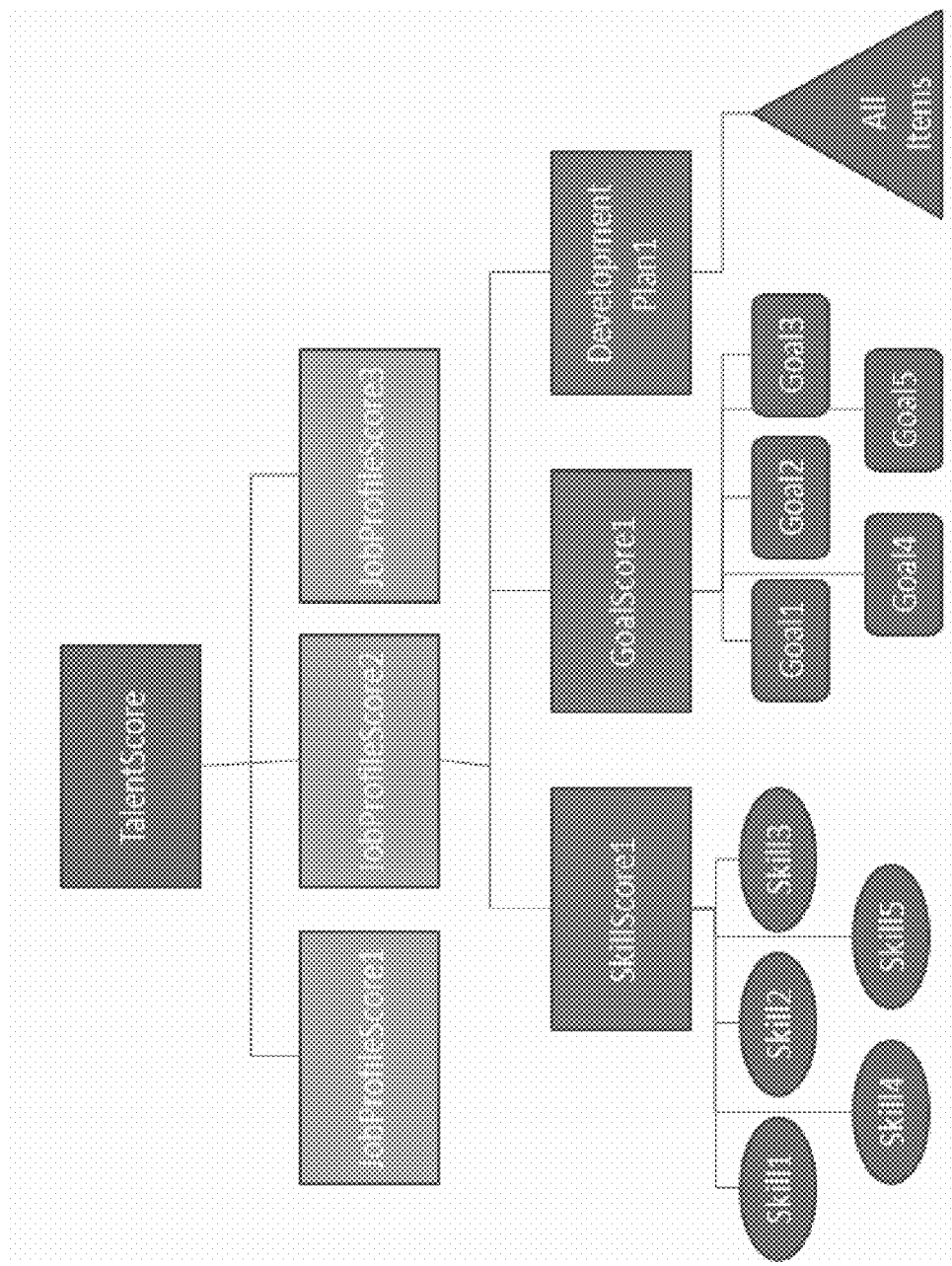
FIG. 2 is relationship diagram of one or more *Scores a in accordance with an illustrative embodiment of the invention.

Turning to FIG. 2, an example relationship and/or software architecture diagram is depicted for the computer-based *Score system in accordance with an embodiment of the invention. An overall Talent Score may be comprised of various Job Profile Scores. Each Job Profile Score is comprised of attributes such as a Skill Score (related to particular skills achieved through work or educational experiences), a Goal Score (related to accomplished or intended goals) and a development plan. Each of the *Scores are described throughout in greater detail. In one embodiment of the invention, a *Score system includes a database of information collected from a pool of candidates for scoring coupled to a scoring engine and a user interface suitable for display in a browser or as a stand alone application. A talent scoring software module can be integrated or linked with a job profile scoring module such that data may be exchanged between them. In turn, one or more of a skill score software module, a goal score software module, and a development plan software module can also be integrated or linked with the job profile scoring module. Various sets of skill, goal, and development plan constituent items can be inputs to the respective skill scoring, goal scoring, and development plan software modules.

According to certain embodiments of the invention, a *Score may be computed to at least three decimal places (e.g. xxxxx.xxx) and can be stored in a database and be available for reporting. Further a user can have one *Score based on current and direct mapped items. In certain embodiments, recurring, indirect mapping, or time-based scores can also be used.

The embodiments described herein refer specifically to a Skill Score, however, one skilled in the art should recognize that other *Scores, unless otherwise noted, may be implemented, calculated, and otherwise presented using the same or substantially similar techniques and algorithms. Specific reference to the Skill Score is exemplary and should not be deemed limiting as it is merely one of several possible *Scores.

In one embodiment, Skill Score is a personal tracking and development score that determines an individual's proficiency for skills that are mapped to a Job Profile. It can be analogized to a credit score for career development, hiring, and other human resource functions. In one embodiment, linear, polynomial or other non-linear weighted element-based algorithms determine relationship and other parameters for courses completed, skills attained and on-the-job experience.

Skill Score users can assign a range to any job profile, both minimum and maximum, based on the number of skills mapped to a particular job profile. The system can determine the Skill Score or any other suitable score for each user that is evaluated for the job profile.

In one embodiment, Skill Score enhances a best-match reporting algorithm in an organization by showing a Best Match Score (Learn Center), if a user self-maps to a job profile (via a Talent Browser), and their Skill Score. Managers can now have a full view of their top performers to aid in mission critical decisions.

A Skill Score can be computed with skills directly mapped to a job profile. Default computation values can be setup in the Learn Center by an administrator or manager. Each computation value can be made available in a Sub-Learn Center ("SubLC"). SubLCs can have different computation values from the parent Learn Center.

According to one embodiment an enhanced or complex Skill Score may be implemented. FIG. 3 depicts an embodiment in which a sample calculation of a Complex Skill Score is generated using individual Skill Scores calculated using a weight, a score, a status for each individual skill. The individual Skill Score values are then totaled to generate a Profile Skill Score.

A Skill Score can have a scale to help compute the multiplier for each skill mapped directly to a job profile. The scores may be based on the minimum and maximum. A differential can be identified. This number can be divided by the number of skills in a job profile. The differential times the number of skills complete/acquired can be added to the minimum to determine the Skill Score for a user.

According to one embodiment, an example minimum is 0 and maximum is 1000. In one embodiment, a plurality of skills, such as for example five skills, can be mapped to a job profile. In one example, if a user has acquired four skills within the job profile mapped to the user. The user has a Skill Score of 800 for this job profile. The default minimum is 0 (zero) and the default Maximum is 1000 (one thousand).

The Skill Score can be added for each job profile. It can use the range—Minimum (default 0) and Maximum (default 1000). Based on the number of skills mapped to the job profile, the system can calculate the Skill Score for each user that is evaluated for the job profile. According to one embodiment, each skill takes the equal weighting while calculating the Skill Score against a job profile. The distributed weighting can be considered.

According to one embodiment, a Skill Score may be calculated using the following formula:

$$\text{Skill Score} = \text{Min Skill Score Range} + [\{(\text{Max Skill Score Range} - \text{Min Skill Score Range})/\text{Number of skills mapped to a job profile}\} * \text{Number of skills completed by User}]$$

The result can be rounded to the nearest integer.

The following Cases are exemplary calculations:

Case 1:
  5 skills are mapped to a job profile
  The Skill Score Range is set as 0 to 1000
  The User has completed 3 skills $$\text{Skill Score} = 0 + [\{(1000 - 0)/5\} * 3]$$
$$= 0 + [\{1000/5\} * 3]$$
$$= 0 + [200 * 3]$$
$$= 0 + 600$$
$$= 600$$

Case 2:
  5 skills mapped to a job profile
  The Skill Score Range is set as 100 to 1000
  User has completed 2 skills $$\text{Skill Score} = 100 + [\{(1000 - 100)/5\} * 2]$$
$$= 100 + [\{900/5\} * 2]$$
$$= 100 + [180 * 2]$$
$$= 100 + 360$$
$$= 460$$

The Skill Score Range can also be available at each Learn Center level. Entering the range at the Learn Center level can inherit the value for each job profile. The administrator can be able to override this range at each job profile level. According to one embodiment, the score range can span from 0 to 99999. Further, the Skill Score can be presented as either a rounded integer, or may be displayed as the exact result (up to a pre-defined decimal digit). The Skill Score can also be displayed using a horizontal graph in the system described below. Any changes made to the Skill Score Range can also be audit trailed, making tracking and monitoring Skill Scores more robust. If a job profile is global (i.e., not specific to a listed job item), the system can use the Skill Score Range from the Learn Center (if not available at the job profile level) in which the job profile was created.

Within the system, the administrator may enable the Skill Score component. To turn on this feature, the registry key "Enable Skill Score" must be used. The key may take the following form:
  Registry=System
  Category=Options
  Key=Enable Skill Score
  Key Type=Value
  Value=0 (disable, default), 1 (enable)

In one embodiment, an additional registry key can be created to allow configuring the colors of the Skill Score horizontal bar graph. Such a key may take the form:
  Registry=Learn Center
  Category=ThresholdColors
  Key=Skill Score
  Key Type=Element Value Pair
  Value=10:red,50:blue,80:green (example)

Such a feature is optional. If the registry key does not exist, the system may use a "Default" Key for the "Threshold Colors" category. If a default key does not exist, it can be show in blue color.

The administrator may add two new permissions to the "Manage Job Profiles" component: Modify Skill Score and View Skill Score. Modify Skill Score grants permission to allow the user to set the Skill Score range in Job Profile as well as Learn Center Configuration screen/graphic interface. The "View Skill Score" permission allows the user to view Skill Score in both the DCTs mentioned earlier in the document as well as Best Match Report.

According to one embodiment, the calculation of Skill Score (for job profile) may be triggered in the system and can record the calculation in a separate historical table in the database. The trigger calculating a new or updated Skill Score occurs under the following conditions:
  a user completes a skill and that skill is mapped to a job profile;
  a user is granted a skill and that skill is mapped to a job profile;

a skill is mapped to job profile (or vice versa) and the user is mapped to job profile; and a user is mapped to a job profile (or vice versa) and that job profile has skills mapped to it.

The records (from an historical table) can be used to display the Skill Score everywhere in the system. If someone changes the Skill Score Range after the system records the Skill Score, the data in the historical table can be retained as is, however when a new record is inserted, the system can use the new Skill Score Range.

While the above calculations are specific to the Skill Score, similar logic can be used to calculate and record other *Scores such as Goal Score, Dev Plan Score, Job Profile Score and Talent Score. In one embodiment, the different scores are interrelated and stored in one or more databases such that a scoring engine can collect information from a score database or another database of applicant or scoring candidates and generate one or more scores and generated a report indicated one or more such *Scores and next steps to improve said *Scores.

Embodiments of the invention may be implemented and accessed by a user through a graphical user interface deployed through a client application resident on a user's computer, or via a web-browser interface over area networks such as the internet or LANs. The user interface may present the user, administrator or evaluator with windows including defining criteria or other characteristics of the Learn Center system.

Figure 4:
FIG. 4 is a screen/graphic interface for a Modify Job Profile object in accordance with an illustrative embodiment of the invention.

According to one embodiment a Job Profile can be created in the Learn Center through the interface. Administrators may use aspects of the interface to define the job as well as the suggested or required criteria needed fore that job. One of the criteria used by an embodiment of the invention is the Skill Score Range. An administrator can define a minimum and maximum Skill Score required to apply and/or to be considered for a listed position. A "Create/Modify Job Profile" screen/graphic interface, as depicted in FIG. 4 can be modified to allow administrators to enter Skill Score Range.

In one embodiment, a new set of fields "Skill Score" Min and Max can be added in this screen/graphic interface to allow administrators to specify the range for calculating Skill Score. Alternatively, the administrator may select "Use Default" and the system will use the Skill Score entered in the Learn Center Configuration options screen/graphic interface. If no Default setting is available in the Learn Center Config options screen/graphic interface, the range may default to 0 to 1000, according to one embodiment. In one embodiment, the Min and Max can be displayed with specificity up to 3 decimal digits.

A table summarizing the requirements of the Create/Modify Job Profile function is given below in Table 1:

| Screen/Graphic Interface | Create/Modify Job Profile |
| --- | --- |
| Description | This screen/graphic interface allows users to create/modify job profile and its properties. |
| Data | NA |
| Actions | A new set of field "Skill Score" (Min and Max) can be added in this screen/graphic interface to allow administrators to specify the range for calculating Skill Score. |

-continued

| | When "Use Default" is selected, the system can use the Skill Score entered in the Learn Center Config options screen/graphic interface. If it is not available in Learn Center Config options screen/graphic interface, it can range from 0 to 1000. The Min and Max can always be displayed with 3 decimal digits. |
| --- | --- |
| Permissions | Modify Skill Score |

Figure 5:
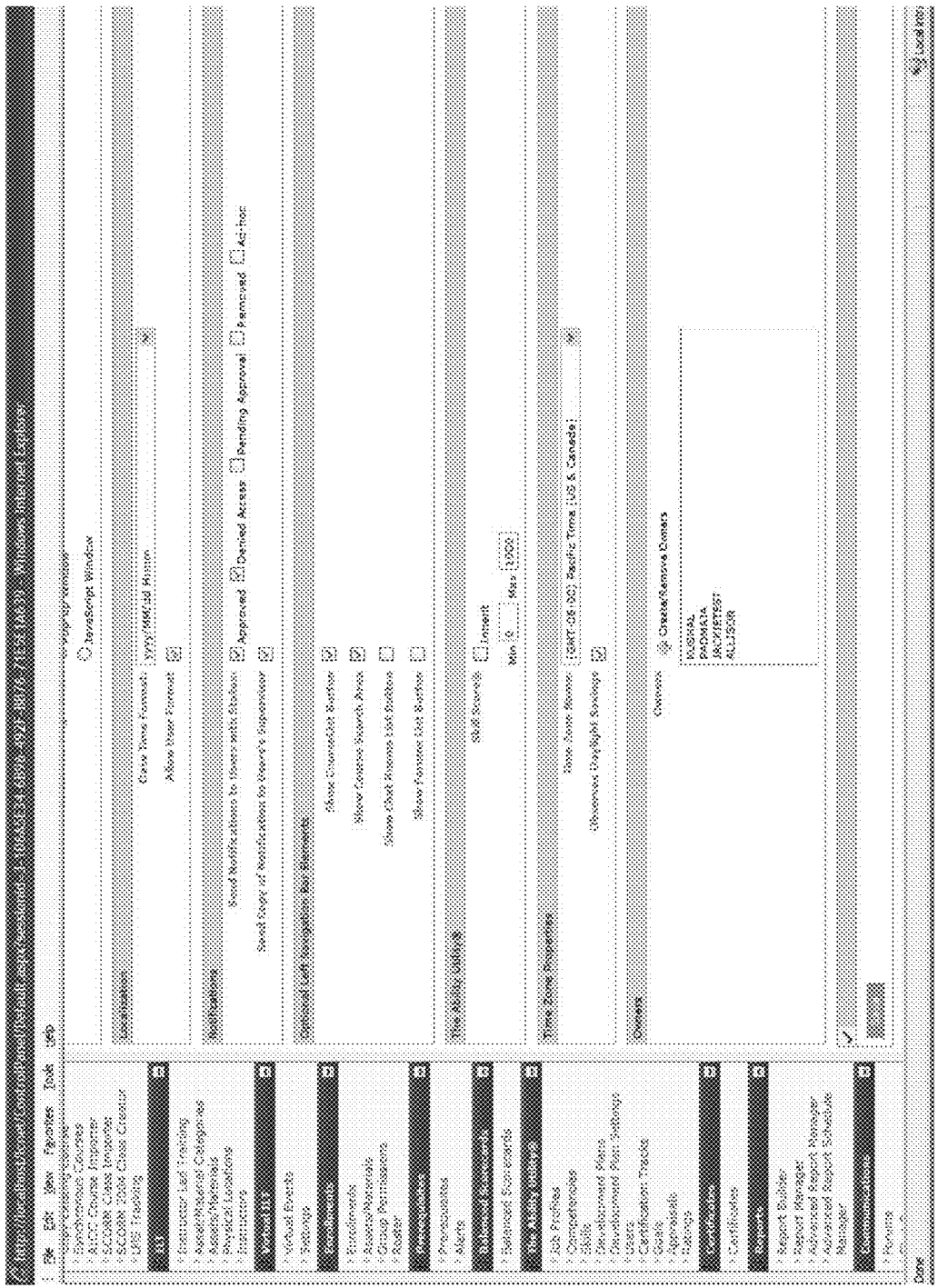
FIG. 5 is a screen/graphic interface for a Config Options object in accordance with an illustrative embodiment of the invention.

According to one embodiment, depicted in FIG. 5, the user interface of the Learn Center includes a "Config Options" function that presents the administrator with a screen/graphic interface allowing many configuration options to be modified, such as the Skill Score Range at Learn Center level. Under the heading "The Ability Utility" a Max and Min Skill Score may be set as the default. An "Inherit" function may be checked to pull the Max and Min Score from the Learn Center's parent center if the current Learn Center is a SubLC. If there is no parent the values of the Max and Min will default to 1000.000 and 0.000, respectively. A table summarizing the functions of a portion of the Config Options menu is given below in Table 2:

TABLE 2

| Screen/Graphic Interface | Config Options |
| --- | --- |
| Description | This screen/graphic interface shows the Learn Center configuration options. |
| Data | NA |
| Actions | A new set of field "Skill Score" (Min and Max) can be displayed in this screen/graphic interface. When "Inherit" checkbox is selected, the system can use the Skill Score Range entered in the current LC's parent LC. If nothing is entered for parent LC, the system can check its parent all the way up to root LC. If it does not find any, it can use 0.000 to 1000.000. |
| Permissions | Modify Skill Score |

Figure 6:
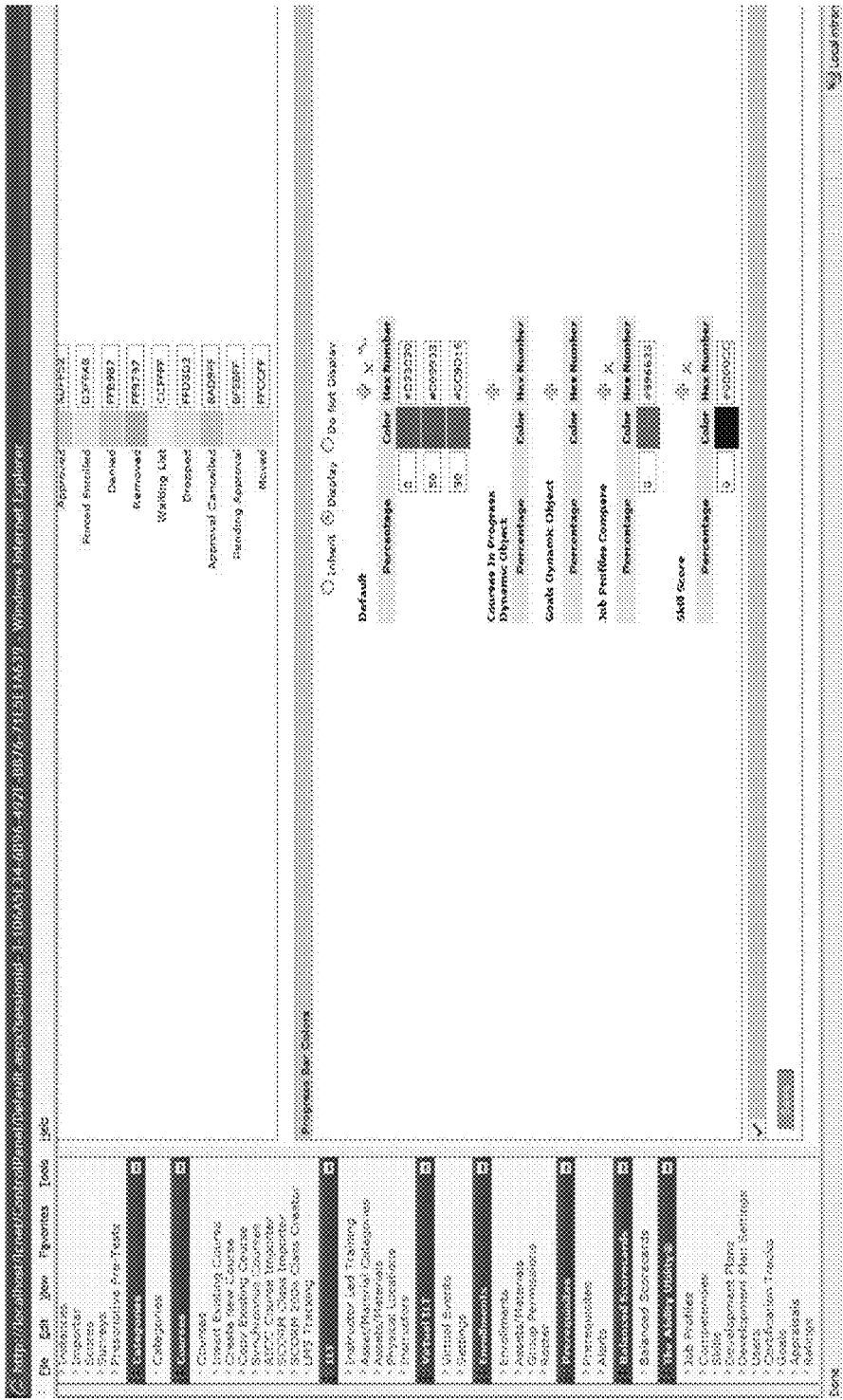
FIG. 6 is a screen/graphic interface for an Appearance—Fonts and Color object in accordance with an illustrative embodiment of the invention.

Another subsection of the Config Options menu, depicted in FIG. 6, contains options for the appearance of fonts and colors within the Learn Center environment. The "Appearance Fonts and Colors" menu can be modified to allow users to set preferences for a Progress Bar and its colors. A table summarizing the requirements of the Appearance Fonts and Colors function is given below in Table 3:

TABLE 3

| Screen/Graphic Interface | Fonts and Colors |
| --- | --- |
| Description | This screen/graphic interface shows settings for fonts and colors for course, enrollment and navigation. |
| Data | NA |
| Actions | 3 new radio buttons to display/hide/inherit Progress Bar can be added here. This can replace the registry key "ShowPercentCompleteBars". Selecting "Display" can be equivalent to setting the registry key to "1". Selecting "Do no Display" can be equivalent to setting the registry key to "0". |

TABLE 3-continued

| | |
|---|---|
| | Selecting "Inherit" can be equivalent to not having the registry key. If "Display" is selected, a new section can show up to allow users to configure colors for the progress bar based on different values. This can replace the "ThresholdColors" registry key. |
| Permissions | No new permissions are required for this. |

A "User—Job Profile Mappings" object, as depicted in FIG. 7, shows "Skill Score" for the user. Under the Job Profile, each of the user's Skill Scores may be displayed. In this menu the users are mapped to a job profile. In the example shown in FIG. 7, there are four possible skills mapped to a job profile. The Skill Score range for the job profile is set from 0 to 1000. Since the skills are weighted equally, each time a user completes or is mapped to a skill, 250 is added to the user's Skill Score. Notice that two users have completed or were mapped to 1 skill and have a resulting Skill Score of 250. Two other users have completed or were mapped to 2 skills and have a resulting Skill Score of 500. One user has not completed or has not been mapped to any skills yet and has a score of 0. One user has completed or was mapped to all 4 skills and has a resulting Skill Score of 1000. A table summarizing the functions of a portion of the Config Options menu is given below in Table 4:

TABLE 4

| | |
|---|---|
| Screen/Graphic Interface | Job Profile - User Mappings |
| Description | This screen/graphic interface shows users mapped to a job profile |
| Actions | A new column "Skill Score" can be added here to show user's Skill Score for the job profile. |
| Permissions | The user must have View Skill Score permission. |

Figure 8:
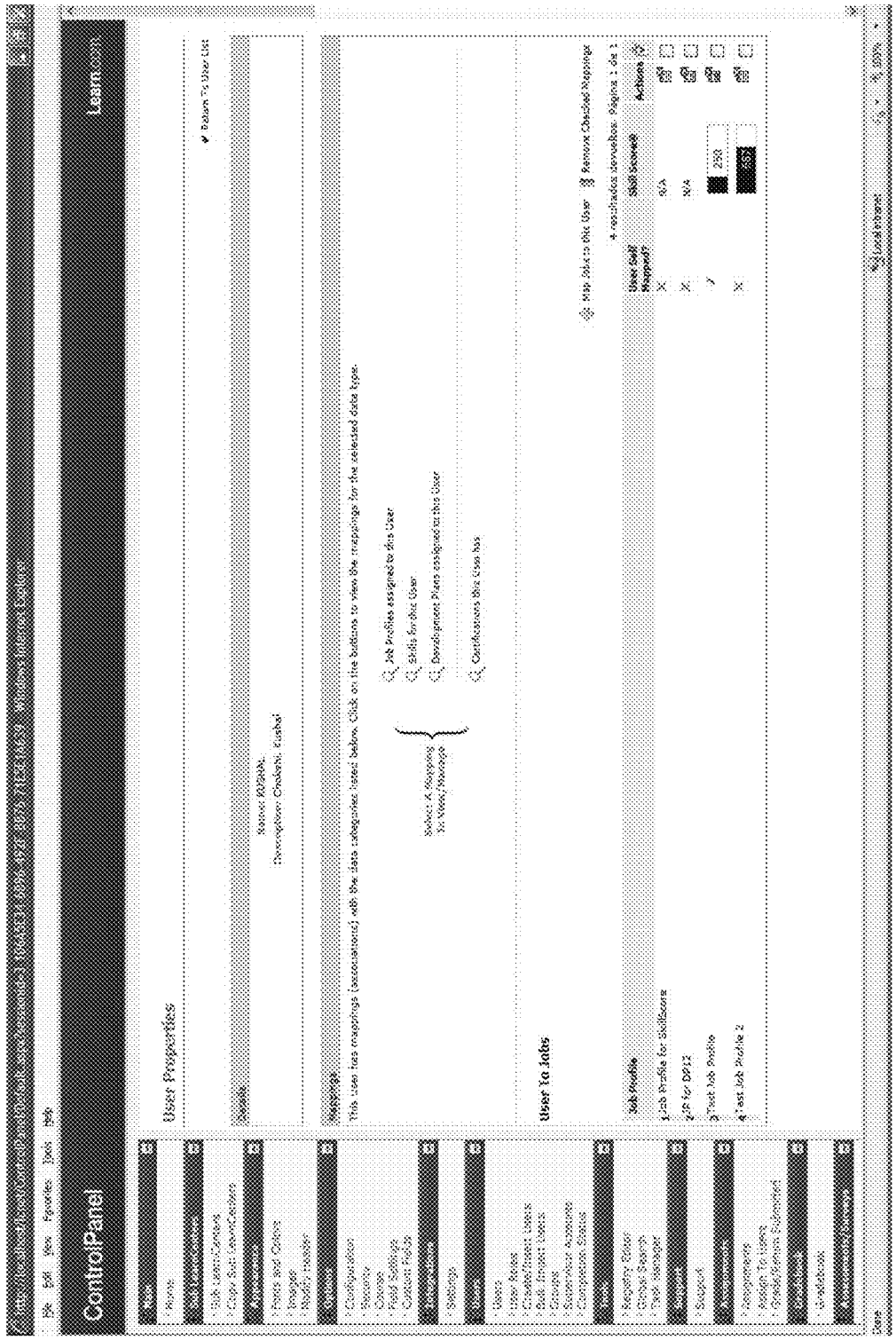
FIG. 8 is a screen/graphic interface for a User- Job Profile Mappings object in accordance with an illustrative embodiment of the invention.

A "Job Profile—User Mappings" function can be modified to show the Skill Score for the user. In this menu, depicted in FIG. 8, the Job Profile is mapped to the user. A table summarizing the functions of a portion of the Config Options menu is given below in Table 5:

TABLE 5

| | |
|---|---|
| Screen/Graphic Interface | User-Job Profile Mappings |
| Description | This screen/graphic interface shows job profiles mapped to a user. |
| Actions | A new column "Skill Score" can be added here to show user's Skill Score for the job profile. |

Figure 9:
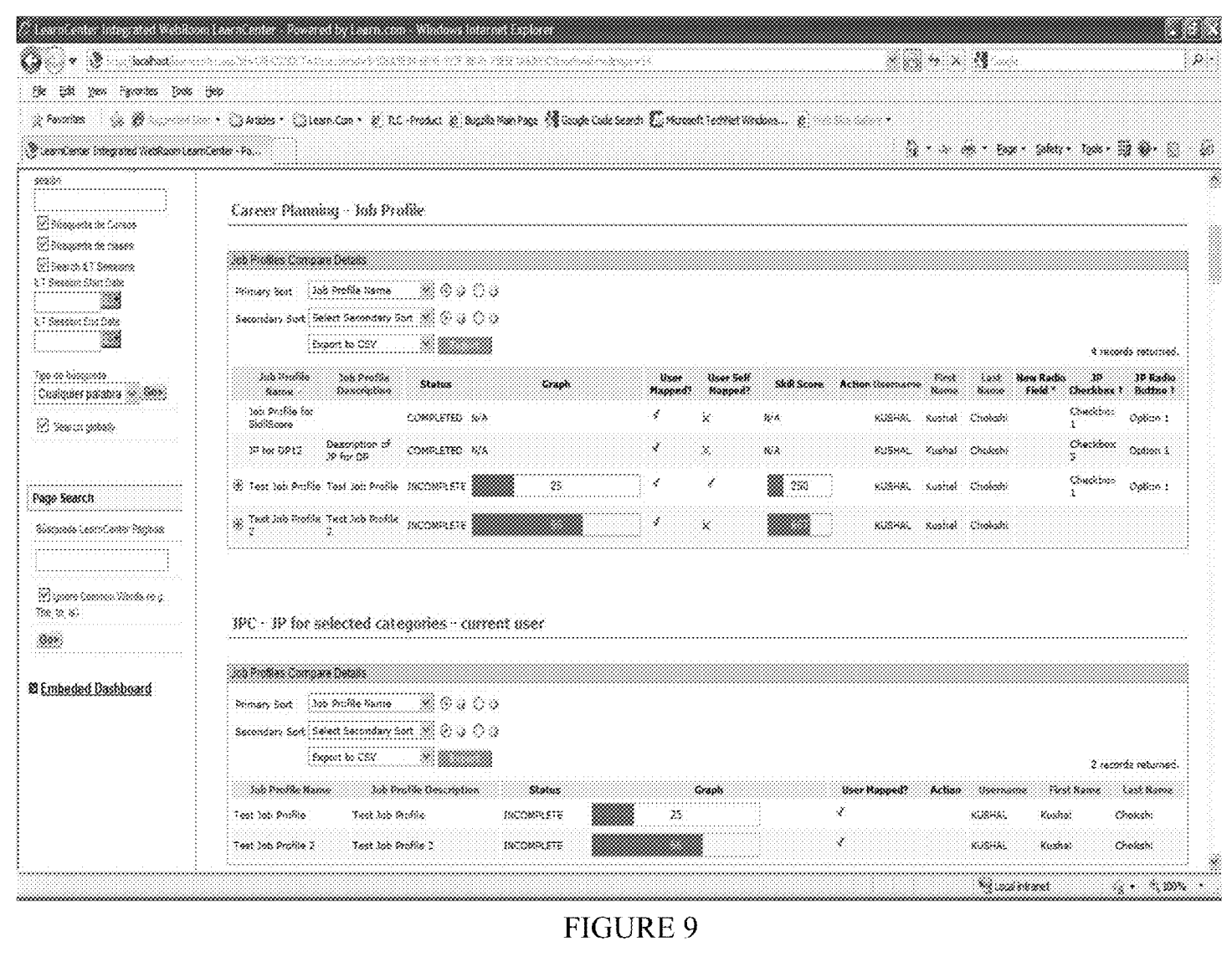

A Dynamic Object Tag, ("DOT") or content tag, called the "Job Profiles Compare Dynamic Object," shown in FIG. 9, shows the Skill Score for each user. The object can also display varying other attributes for the user against selected job profiles. A configuration wizard allows the administrator to select from several fields to display as columns in the object. Columns fields may include, without limitation, Job Profile Name, Job Profile Description, Status, Graph, Mapped Item Nature, Mapped Item Type, User Name, First Name, and Skill Score. A table summarizing the functions of a portion of the Jobs Profile Compare Object menu is given below in Table 6:

TABLE 6

| | |
|---|---|
| Tag Name | Job Profiles Compare |
| Description | This DOT shows selected user's progress against selected job profiles. |
| Actions | A new column "Skill Score" can be added in the result set. The user must have "View Skill Score" permission to see the column. |
| Columns | A new column "Skill Score" can be added in the list of columns displayed in the column selector in the Job Profiles Compare Wizard. |

Figure 10:
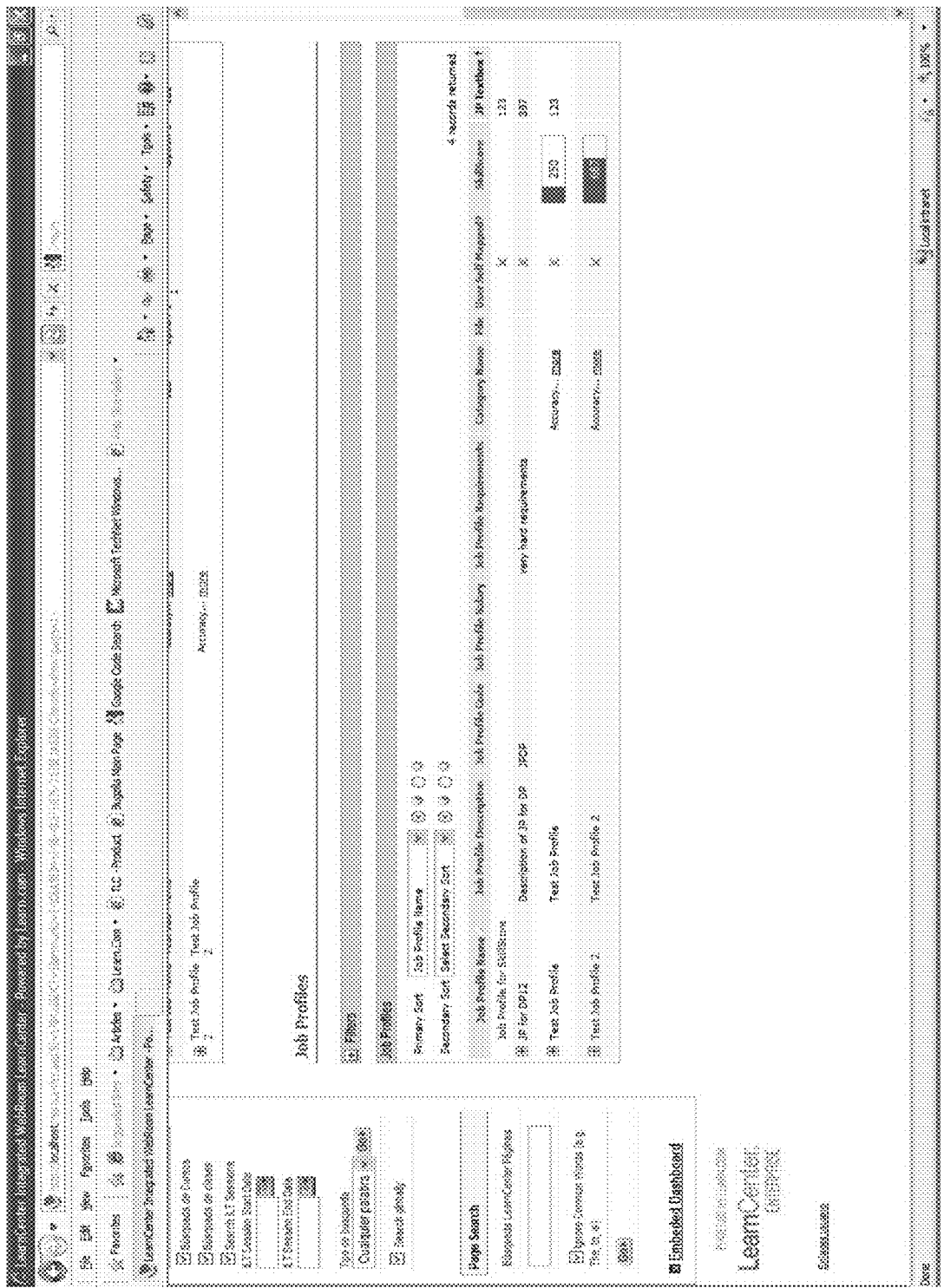
FIG. 10 is a screen/graphic interface for a Job Profiles object in accordance with an illustrative embodiment of the invention.

A "Job Profiles Dynamic Object," depicted in FIG. 10, shows the Skill Score for the current user. This object displays a list of all of the Job Profiles create or used by a selected user. A table summarizing the functions of a portion of the Job Profiles object menu is given below in Table 7:

TABLE 7

| | |
|---|---|
| Tag Name | Job Profiles |
| Description | This screen/graphic interface shows list of all Job Profiles of Job Profiles for the current user. |
| Actions | A new column "Skill Score" can be added here. The user must have "View Skill Score" permission to see the column. |
| Columns | A new column "Skill Score" can be added in the list of columns displayed in the column selector |

Figure 11:
FIG. 11 is a screen/graphic interface for a Best Match object in accordance with an illustrative embodiment of the invention.

A "Best Match Report" object, shown in FIG. 11, may be configured in the administrator's Control Panel or a Supervisor Control Panel. The object may be configured to show the Skill Score for each user. The Best Match Report object may be used to generate a report showing the best match score (for skills) for the users against a selected job profile.

While the embodiments described above describe an embodiment generating, and reports a Skill Score, alternative embodiments are contemplated, and may also be implemented with he Learn Center using substantially similar implementations. Alternative embodiments include, but are not limited to, Goal Score, Development Plan Score, Job Profile Score, and Talent Score.

In one embodiment a Learn Center Report can be generated in which Job Profiles are displayed showing a Skill Score. Further, a Dashboard may be implemented in which a user's Talent Score is displayed with a drill down menu allowing display of all other scores mentioned above (Skill Score Goal Score, Development Plan Score, Job Profile Score, etc.).

Additional capabilities of the Learn Center include, a report to show Item Score for user by date, Communication Messages, such as pop-ups, emails, SMS messages, or other communications, are generated when the system records a Skill Score, notifications on scheduled time to send Skill Score to user and his supervisor, scheduled tasks to capture the Skill Score on a "regular" frequency, and allowing administrators to override/enter Skill Score for a user.

The embodiments described above calculate and generate Skill Scores or other scores using equally weighted factors. One skill is as important as the next. In an alternative embodiment, Skill Scores and other *Scores may be calculated using weighted skills or other criteria. According to one embodiment of the invention, the "Modify Job Profile", "Job Profile To Skill Mapping" and "Skill to Job Profile Mapping" functions and displays, as described above can be modified to show weighting factors for each skill towards job profile.

The skill score calculation can be modified to consider skill weighting. In one embodiment, a weighted Skill Score calculation is included in a component requiring clients to purchase the capability separately.

The scoring engine can include different rules and processing steps for determining scores. In one embodiment, a weighted relationship is used for calculating the weighted Skill Score, according to this embodiment, may be depicted as:

Skill Score=Min Skill Score Range+[(Max Skill Score Range−Min Skill Score Range)*Skill1%]+[(Max Skill Score Range−Min Skill Score Range)*Skill2%]+ . . . .

The following exemplary cases highlight the use of the weighted Skill Score:

Case 1:
5 skills mapped to a job profile.
3 skills are worth 20%, 1 skill is worth 30% and 1 skill is worth 10%
The Skill Score Range is set as 0 to 1000
User has completed 3 skills (2 worth 20% and 1 worth 10%)

$$\begin{aligned}\text{Skill Score} &= 0 + [(1000-0)*20\%] + [(1000-0)*20\%] + \\ &\quad [(1000-0)*10\%] \\ &= 0 + 200 + 200 + 100 \\ &= 0 + 500 \\ &= 500\end{aligned}$$

Case 2:
5 skills mapped to a job profile
3 skills are worth 20%, 1 skill is worth 30% and 1 skill is worth 10%
The Skill Score Range is set as 100 to 1000
User has completed 2 skills (1 worth 20% and 1 worth 30%)

$$\begin{aligned}\text{Skill Score} &= 100 + [(1000-100)*20\%] + [(1000-100)*30\%] \\ &= 100 + [900*20\%] + [900*30\%] \\ &= 100 + 180 + 270 \\ &= 550\end{aligned}$$

A job mapping screen/graphic interface can be used to enter weighting for each skill mapped to the job profile. This screen can be invoked from Job Profile to Skill Mapping screen. In one embodiment, numeric integers are accepted as the weighting percentages. In a further embodiment, the system may enforce the rule that sum of all skills' weighting percentages must total 100%.

Figure 12:
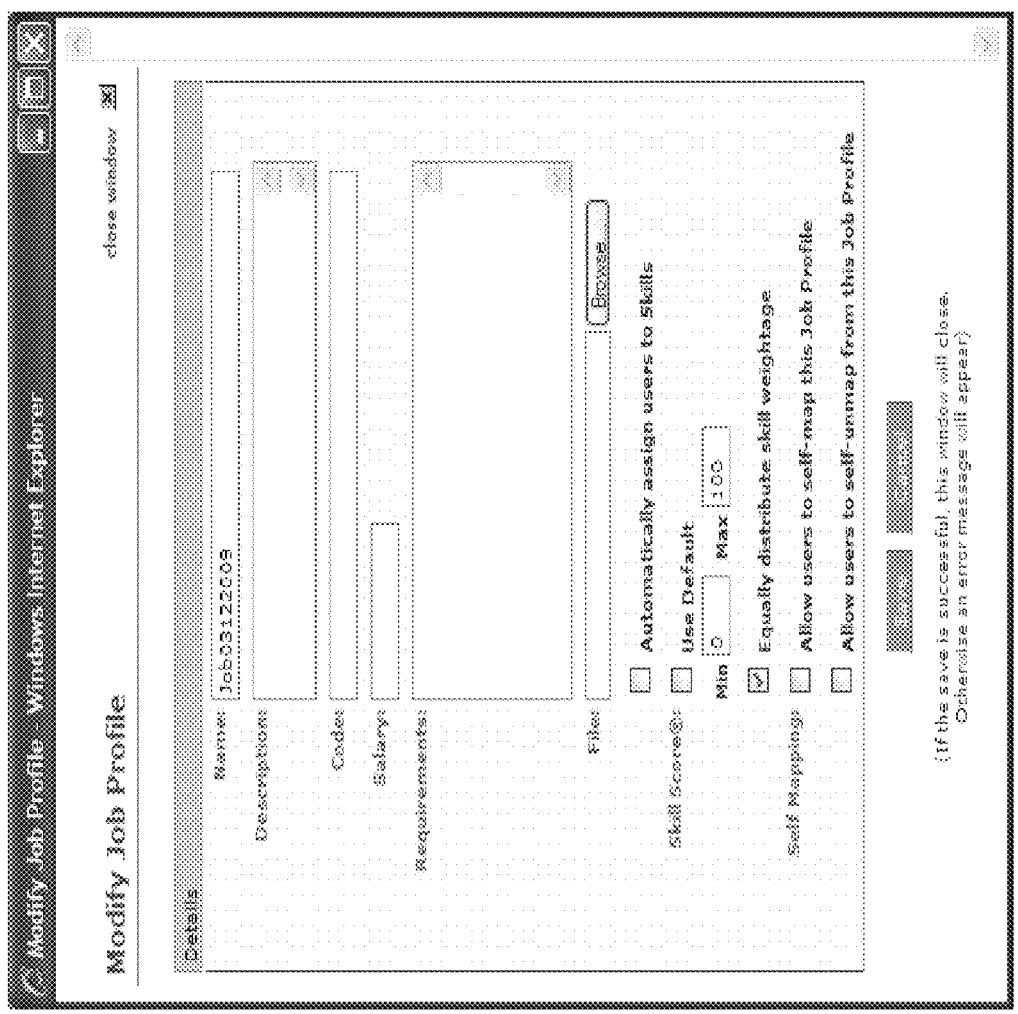
FIG. 12 is a screen/graphic interface for a Modify Job Profile object in accordance with an illustrative embodiment of the invention.

The Modify Job Profile Screen/Graphic Interface discussed above can be adapted to use a weighted skill calculation. The screen/graphic interface depicted in FIG. 12 includes a checkbox, that if unselected will present the administrator with an assign the weight of the tasks in the Job Profiles Properties Object, described below. A table summarizing the functions of a portion of the Modify Job Profile object menu is given below in Table 8:

TABLE 8

| Screen/Graphic Interface | Modify Job Profile |
|---|---|
| Description | This screen/graphic interface shows job profile properties. |
| Data | NA |
| Actions | A new checkbox "Equally distribute skill weightage" can be added. This checkbox can be checked by default (all existing job profiles can show this checked as well) This checkbox can only be available if Skill Score is purchased. When this checkbox is checked, the system can treat all skills equally while calculating the skill score. The "Modify Skill Weightage" screen/graphic interface (described later in the document) can not be available in this case. When this checkbox is unchecked, the system can allow different weighting for the skills mapped to job profile and use this weighting while calculating skill score. The "Modify Skill Weightage" screen/graphic interface (described later in the document) can be available in this case. If the checkbox setting is changed from unchecked to checked, the system can reset the weighting for all skills to "equal weighting". |

Figure 14:
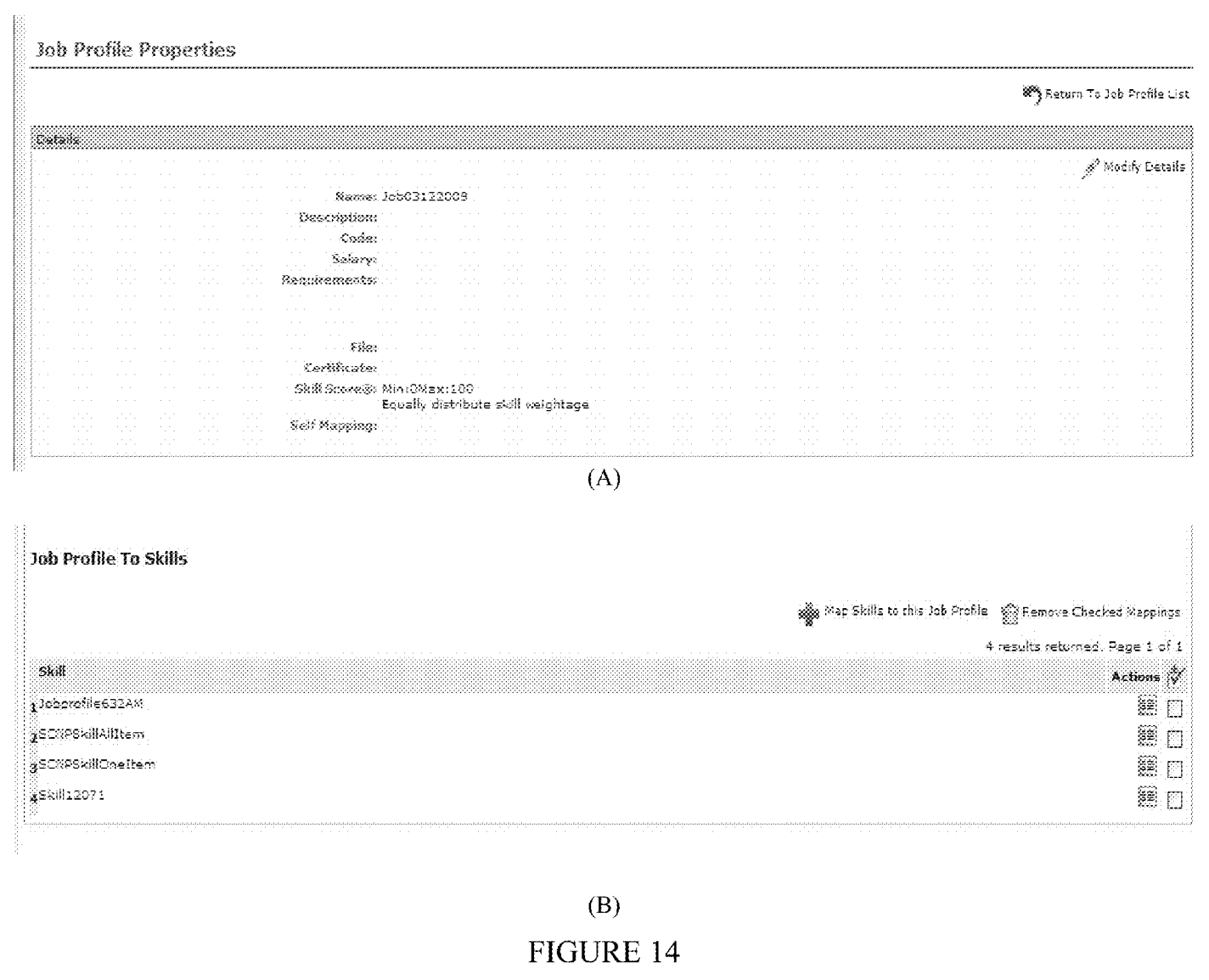

FIG. 13A shows a Job Properties object when the "Equally distribute skill weightage" is unchecked. Under "Skill Weightage (%)" the administrator may adjust the percentages based on the job profiles need to present a more accurate Skill Score. As shown in FIG. 13B, the administrator has redistributed the weight among the four skills listed. When the "Equally distribute skill weightage" is checked, a Job Profiles Properties object, such as that depicted in FIG. 14A is shown. Further, in the Job Profile to Skills object shown in FIG. 14B, there is no column showing the distribution of weight across the four skills. A table summarizing the functions of a portion of the Job Profiles to Skills Mapping object menu is given below in Table 9:

TABLE 9

| Screen/Graphic Interface | Job Profiles To Skills Mapping |
|---|---|
| Description | This screen/graphic interface show skills mapped to job profile. |
| Data | NA |
| Actions | A new column "Skill Weightage" can be added to show the weightage for each skill mapped to job profile. When the skills are equally distributed, this field can show "N/A" (this happens when the checkbox is changed from checked to unchecked). A new button "Modify Skill Weightage" can be added on top to allow users to modify skill weightage. Clicking the button can open a modal screen/graphic interface "Modify Skill Weightage". This screen/graphic interface can list each skill that is mapped to job profile along with a text box to enter the percentage for skill weightage. Only numeric digits without any decimal can be allowed in the text box.(0 can be allowed) |

TABLE 9-continued

| | |
|---|---|
| | Before saving, the system can validate the sum of all numbers entered in the text boxes must be 100.
Once the weighting is entered, any new skill mapped to the job profile can automatically get 0% weighting. The admin can go back in the "Modify Skill Weightage" screen/graphic interface to adjust the weightage.
If the job profile does not have any skill mapped to it and if the user maps multiple skills to the job profile, each skill can be populated with equal weightage i.e. it can show "Equally Distributed". |
| Permissions | Modify Skill Weightage (new permission under Manage Job Profiles) |

Figure 15:
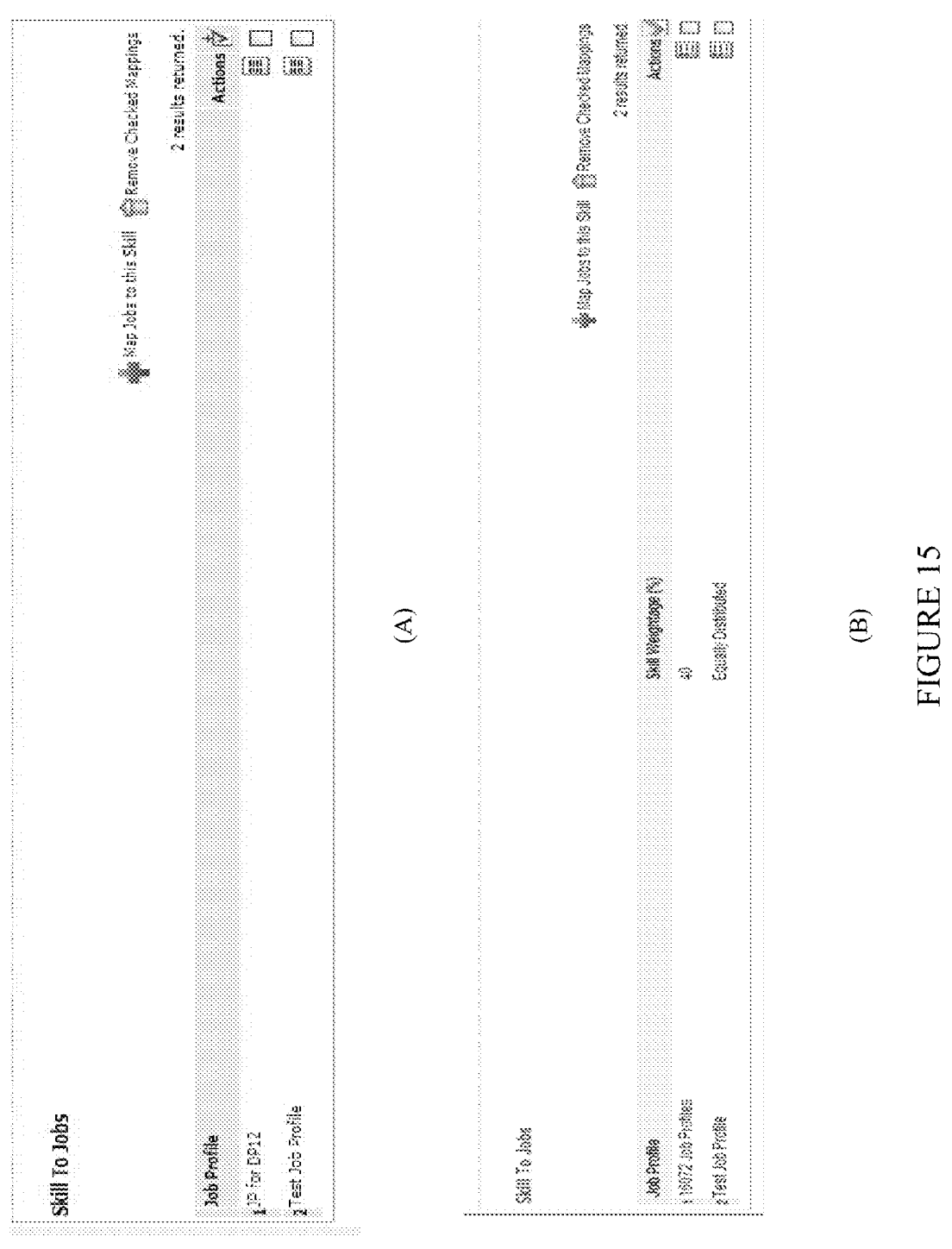

FIG. 15A shows a Skill to Jobs object when there is no weighting factored in to the Skill Score, while the Skill to Jobs object shown in FIG. 15B includes a column showing the differently skill weightage as mapped to a job profile. A table summarizing the functions of a portion of the Skill To Job Profiles Mapping object is given below in Table 10:

TABLE 10

| | |
|---|---|
| Screen/Graphic Interface | Skill To Job Profiles Mapping |
| Description | This screen/graphic interface shows all job profiles mapped to skill. |
| Data | NA |
| Actions | A new column "Skill Weightage" can be added to show the weightage of the skill towards each job profile.
This column can show up only if the Skill Score has been purchased.
This column can show "Equally Distributed" if the skill is equally distributed for the job profile. |

In one embodiment, the existing skill mappings can be updated to populate equal weightage for job profile. For example, if 4 skills are mapped to job profile, each of these skills can be updated with 25% weightage. If 3 skills are mapped to job profile, 2 of them can be updated with 33% and one can be updated with 34%.

Another embodiment of the Learn Center system includes enhancements to Skill Score. Skill Score may be implemented as an optional feature sold separately from the standard set of Learn Center features. A user's Skill Score is a ranking or number that reflects his or her readiness for a job based on the completion of skills mapped to a job profile. An administrator can look at a user's Skill Score to help determine whether a candidate is suited or ready for a particular job within an organization.

Additional Computer Software Embodiments Suitable for Executing on a Processor

In one embodiment, the invention relates to a tangible non-transitory computer-readable storage medium having computer-executable instructions stored thereon that, if executed by a computer based system for scoring candidates based on a plurality of data and existing score data, cause the computer based system to perform operations comprising: launching a graphical user interface to collect data from each scoring candidate such that a plurality of secondary scores are generated for each applicant; launching a scoring engine to transform and process the plurality of secondary scores for each scoring candidate to generate at least one of a report, and at least one of a Skill Score, a Talent Score, a Job Profile Score, and a Goal Score and generating a report for each scoring candidates that includes one or more scores and development plan information.

In part, the invention relates to a computer-based method of normalizing a pool of individuals relative to at least one *Score, the method includes displaying a first icon in a first computer interface, wherein the first computer interface comprises data input fields relating to skills, goals, and development plan items; launching a scoring engine to converted the data received from the data input fields into skill scores, goal scores, and a development plan; processing the skill scores, goal scores, and a development plan using the scoring engine to generate a plurality of job profile scores; and transforming the plurality of job profile scores into a talent score.

Various Computer Based Embodiments of the Scoring System and Related Methods

The present invention may be embodied in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In one embodiment of the present invention, some or all of the score generation and reporting are processed and transformed using a set of computer program instructions or software instructions that is converted into a computer executable form, stored as such in a computer readable medium, and executed by a microprocessor under the control of an operating system. In one embodiment, data received from scoring candidates is transformed into processor-understandable instructions suitable for generating scores, reports and development plans, and other processes, transformations, features and embodiments as described above.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, C#, JAVA, or HTML) for use with various operating systems or operating environments. The source code may define and use various data structures, methods, and instructions relating to or suitable for implementing the embodiments described herein. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed over a network.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Various examples of suitable processing modules are discussed below in more detail. As used herein a module or software module refers to software, hardware, or firmware suitable for performing a specific data processing, data transmission task or other automated function or process using a processor or computer. Typically, in one embodiment a module refers to a software routine, program, or other memory resident application suitable for transforming, receiving, translating, scoring, storing and processing instructions, or various types of scores, user information, job reports, skill reports, and other educational or score-related information or data of interest described herein or otherwise relating to the embodiments of the invention.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain embodiments of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A computer system for characterizing job applicant data, the computer system comprising:
   a memory device; and
   a processor in communication with the memory device, wherein the memory device comprises instructions that when executed by the processor cause the processor to:
   define a range for an attribute score;
   define a profile comprising a maximum number of attributes;
   calculate the attribute score for a user based on a number of satisfied attributes out of the maximum number of attributes, wherein the attribute score is calculated as a difference of a maximum range value and a minimum range value divided by the maximum number of attributes times the number of satisfied attributes, plus the minimum range value;
   compare the attribute score to a threshold score to determine a level of correlation between the user and the profile.

2. The computer system of claim 1 wherein the each of the attributes is weighted.

3. The computer system of claim 1 wherein the attribute is a skill.

4. The computer system of claim 1 wherein the attribute is a goal.

5. The computer system of claim 1 wherein the attribute is a development plan score.

6. The computer system of claim 1 wherein the attribute is proficiency for a job.

7. The computer system of claim 1 wherein the attribute is a talent score, the talent score based on at least one of a skill, a goal, a development plan, and proficiency for a job.

8. The computer system of claim 1 wherein the instructions that when executed by the processor further cause the processor to:
   present a user interface to a prospective job applicant;
   receive input from the prospective job applicant; and use the input as a basis for calculating the attribute score.

9. The computer system of claim 1 wherein the instructions that when executed by the processor further cause the processor to:
- present a user interface to an administrator seeking a prospective employee;
- receive input from the administrator, the input defining the attributes;
- use the input from the administrator as a basis of defining the profile.

10. A non-transitory computer-readable medium comprising computer-executable instructions for performing a method of quantifying a user's correlation to a suggested profile, the method comprising:
- defining a range for an attribute score;
- defining a profile comprising a maximum number of attributes;
- calculating the attribute score for a user based on a number of satisfied attributes out of the maximum number of attributes, wherein the attribute score is calculated as a difference of a maximum range value and a minimum range value divided by the maximum number of attributes times the number of satisfied attributes, plus the minimum range value;
- comparing the attribute score to a threshold score to determine a level of correlation between the user and the profile.

11. A method of quantifying a user's correlation to a suggested profile, the method comprising:
- defining, by a computer system, a range for an attribute score;
- defining, by the computer system, a profile comprising a maximum number of attributes;
- calculating, by the computer system, the attribute score for a user based on a number of satisfied attributes out of the maximum number of attributes, wherein the attribute score is calculated as a difference of a maximum range value and a minimum range value divided by the maximum number of attributes times the number of satisfied attributes, plus the minimum range value;
- comparing, by the computer system, the attribute score to a threshold score to determine a level of correlation between the user and the profile.

12. The method of claim 11 wherein the each of the attributes is weighted.

13. The method of claim 11 wherein the attribute is a skill.

14. The method of claim 11 wherein the attribute is a goal.

15. The method of claim 11 wherein the attribute is a development plan score.

16. The method of claim 11 wherein the attribute is proficiency for a job.

17. The method of claim 11 wherein the attribute is a talent score, the talent score based on at least one of a skill, a goal, a development plan, and proficiency for a job.

18. The method of claim 11 further comprising:
- presenting, by the computer system, a user interface to a prospective job applicant;
- receiving, by the computer system, input from the prospective job applicant; and
- using, by the computer system, the input as a basis for calculating the attribute score.

19. The method of claim 11 further comprising:
- presenting, by the computer system, a user interface to an administrator seeking a prospective employee;
- receiving, by the computer system, input from the administrator, the input defining the attributes;
- using, by the computer system, the input from the administrator as a basis of defining the profile.

* * * * *